United States Patent [19]

Watanabe

[11] 4,349,262
[45] Sep. 14, 1982

[54] AUTOMATIC FILM WINDING DEVICE HAVING A MOVABLE GRIP MEMBER

[75] Inventor: Yoshitaka Watanabe, Tokyo, Japan

[73] Assignee: Canon Kabushiki Kaisha, Tokyo, Japan

[21] Appl. No.: 211,723

[22] Filed: Dec. 1, 1980

[30] Foreign Application Priority Data

Nov. 29, 1979 [JP] Japan .................................. 54-154731

[51] Int. Cl.³ .......................... G03B 19/04; G03B 1/18
[52] U.S. Cl. ...................................... 354/173; 354/295
[58] Field of Search ............... 354/173, 213, 214, 212, 354/293, 295

[56] References Cited

U.S. PATENT DOCUMENTS

| | | | |
|---|---|---|---|
| 3,280,713 | 10/1966 | Goldberg | 354/173 X |
| 3,820,148 | 6/1974 | Osanai | 354/295 |
| 4,037,240 | 7/1977 | Ando et al. | 354/212 |
| 4,118,659 | 10/1978 | Klemm | 354/173 X |
| 4,196,992 | 4/1980 | Shono | 354/173 |

*Primary Examiner*—Donald A. Griffin
*Attorney, Agent, or Firm*—Toren, McGeady & Stanger

[57] ABSTRACT

An automatic winding device for a camera adapted to be operatively mounted on a camera body to perform film winding action includes a main body part adapted to be connected with the camera body and a grip part including a release button operably connected with the main body part and mounted to be movable relative thereto to a plurality of desired positions.

10 Claims, 8 Drawing Figures

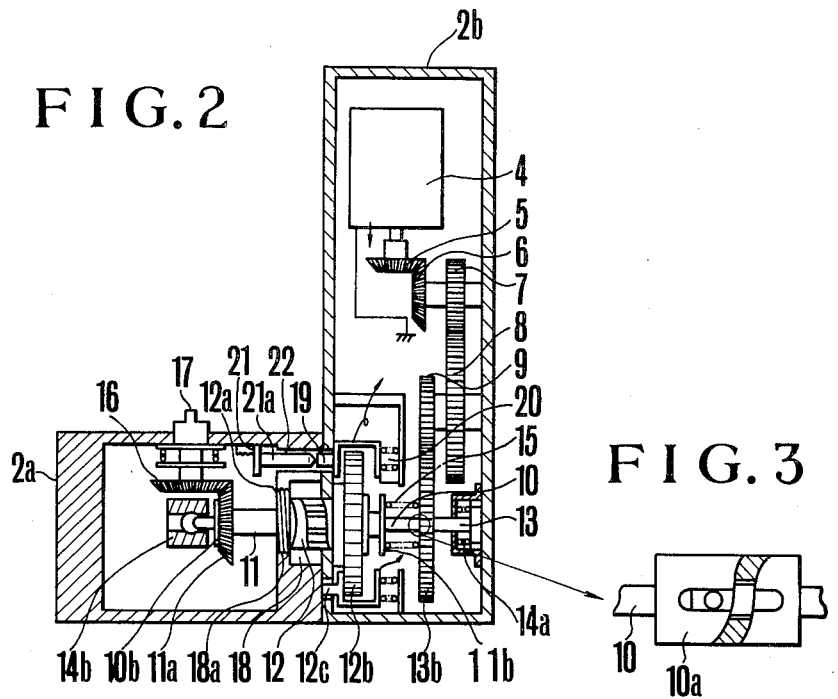
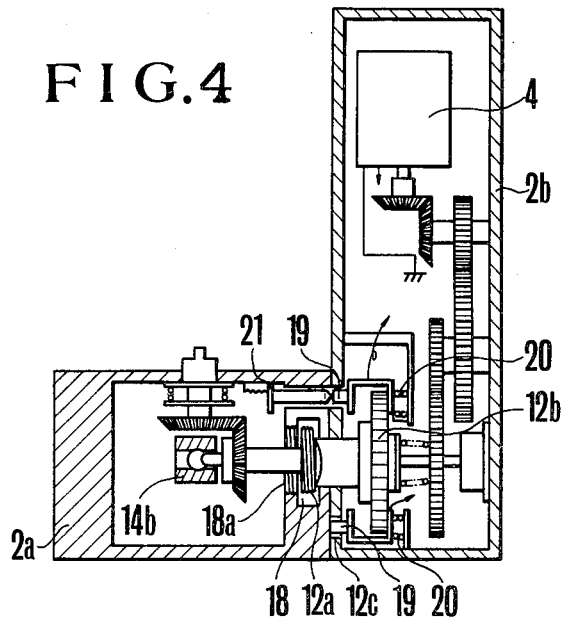

AUTOMATIC FILM WINDING DEVICE HAVING A MOVABLE GRIP MEMBER

The present invention relates generally to photographic devices and, more particularly, to an automatic film winding device for a camera. The invention is particularly directed to a film winding device having a movable grip which may be mounted on a camera body to automatically perform film winding action and shutter actuation.

It is generally known to provide an automatic winding device for a camera wherein, for example, a motor drive device may be mounted on the camera and wherein a grip member of the winding device is formed to contain a release button. Such winding devices are useful from the viewpoint of the handling characteristics thereof in order to enable the camera to be firmly held and in order to enhance the mobility of the camera. Additionally, a battery control circuit and/or a motor element or the like have been housed within a grip member of the winding device and it has been attempted to reduce the size of the motor drive device.

However, where a grip member is affixed with the winding device, there may arise disadvantages in that insufficient space is available between the grip member and a lens member of the camera depending upon the size of the lens which is to be used. Thus, the grip member may constitute an obstacle to easy handling of the camera assembly. Therefore, it would be advantageous to provide a winding device having a motor drive which may operate such that the position of its grip member may be changed as desired by an operator.

Additionally, from the standpoint of the handling characteristics of the motor driven device, variations in its performance which derive from variation in the performance of a battery depending upon the conditions during photography may constitute an important problem. While a motor drive device exhibits functional characteristics to its full extent when used under normal temperature conditions, considerable deterioration may arise in performance in some cases when used under varying temperature conditions, for example, during low temperature conditions at a skiing location or in a cold area.

Therefore, it is desirable to provide such a motor driven device structured so that parts such as the battery can be easily exchanged depending upon the conditions under which photography is to be performed so that the device can exercise full performance at all times.

In addition to aspects which relate to the exchange of parts or batteries, the types of accessory devices which are to be attached to a camera body may determine the optimum angle or position at which the winding device grip member should be attached. For example, when using a heavy telephotographic lens, it is easier to hold the weight when the grip member is positioned at about a central location relative to the camera body and extends in a downward direction. On the other hand, when a wide angle lens or a relatively short telephotographic lens is mounted on the camera, it is more suitable for enhanced handling characteristics to locate the grip along a side wall of the camera pointing upwardly.

However, if the grip member is structurally positioned along a side wall of the camera pointing upwardly, the grip may constitute an obstacle for attachment of other parts such as, for example, a long film unit.

There have been two methods for changing the position of a grip member of a winding device. One of these involves the provision of a camera motor drive unit and the grip member as separate units. In such a device, the grip is attached to a camera motor drive unit by an attaching part during ordinary circumstances and, when longer length film is used, the grip member is attached at another position of the camera motor drive unit through an adapter member. However, in this approach, when a long length film is to be used, an adapter member or the like must be used for attaching the grip and, in order to avoid this, attaching connectors must be provided for two or more different positions. As has been previously mentioned, this method has shortcomings in that the attaching characteristics are undesirable and a larger size of the total unit results.

Another method or approach is to utilize a folding type grip as in a movie camera. That is, the grip member of such a device may function during the time that photography is taking place and it may be folded down for carrying in order to reduce the size of the total unit so that a more compact overall structure may result thus providing improvements in the carrying characteristics thereof. However, this approach does not enable the position of the grip to be selected, as may be desired during different photography conditions.

Heretofore, there has been provided a motor drive unit wherein a battery or batteries can be exchanged. However, it has not been such as to facilitate such exchange in accordance with the photography conditions, but instead it has been such as to merely enable a change in the type of battery used, not a change in the specified performance of the motor drive unit itself.

The present invention is directed toward elimination of these shortcomings of conventional devices and is intended to provide an automatic winding device having a grip which will facilitate easy and convenient use of the winding device with a camera.

SUMMARY OF THE INVENTION

Briefly, the present invention may be described as an automatic winding device for a camera adapted to be operatively mounted on the camera body to perform film winding action comprising a main body part adapted to be connected to a camera body and a grip part including release button means thereon operably connected with the main body part and mounted to be movable relative thereto to a plurality of different desired operating positions.

By a further aspect of the present invention, the driving source or motor of the automatic winding device is housed within the grip part and a transmission system is provided to transmit the driving force through a connecting plane between the grip part and the main body part of the winding device. The device is structured so that a movable center of the grip part will almost coincide with an axis of the transmission system.

The transmission system whereby driving force is transmitted from the grip part to the main body part is arranged so that the length of the transmission system may be freely extended or shortened.

Thus, with the present invention, the coupling mechanism for engaging the automatic winding device with the camera body is arranged to be located in the main body part of the overall assembly and the driving source or motor as well as the transmission mechanism associated with the coupling mechanism are housed within the grip. The main body part is provided with an elongate slot through which the transmission mechanism may extend and by loosening the attachment mechanism between the grip member and the main body part, the grip member may be moved with a transmission axle of the transmission means sliding along the elongate slot to any one of a number of operative positions and the device may be secured at any such given position by tightening the connection means provided between the grip member and the main body part.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is a sectional view showing the internal arrangements included within both a main body part and a grip part of the motor drive unit of the invention when the grip member is in the position depicted in FIG. 1 in solid line form with the parts engaged in operative condition;

FIG. 3 is a detailed view of a part of the assembly shown in FIG. 2;

FIG. 4 is a cross sectional view of the assembly shown in FIG. 2 with the device shown in the released condition wherein the grip member may be moved relative to the main body part;

DETAILED DESCRIPTION OF THE PREFERRED EMBODIMENTS

Figure 1:
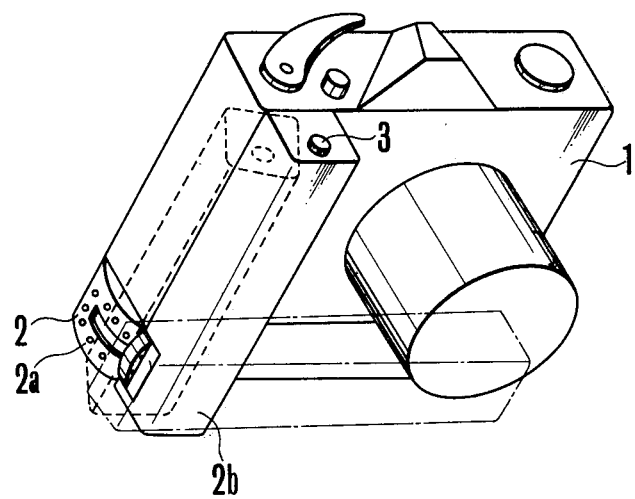
FIG. 1 is a perspective view showing a camera system wherein a motor drive unit in accordance with the present invention which includes a grip member is mounted on a camera body, with the grip member shown in different positions in solid line form and in chain-dot line form.

Referring now to the drawings, wherein like reference numerals are used to identify similar parts throughout the various figures thereof, there is depicted in FIGS. 1-6 an embodiment of the invention wherein an automatic winding device in accordance with the invention is applied as a motor drive device using an electric motor as the driving power source therefor. As shown in FIG. 1, a camera main body 1 is arranged with the motor drive unit or winding device 2 of the present invention attached thereto. The motor drive unit or winding device of the invention consists of a main body part 2a and a grip member 2b with the grip member 2b having a release button 3 located thereon.

As best seen in FIG. 2, the grip member 2b houses a motor 4 and a reduction gear train which includes the gears 5, 6, 7, 8, and 9. This gear train operates to transmit a driving force from the motor 4 and it will be seen that the motor 4 and the gear train are housed within the grip member 2b.

The main body part 2a of the motor drive unit of the invention and the grip member 2b are affixed to each other by transmitting members 10, 11 and by tightening screws 12 as will be described in greater detail hereinafter. The transmitting member 10 engages, as best seen in FIG. 3, by means of a key and a keyway, with an axle 13 having a gear 13b engaging with the aforementioned gear train, as best seen in FIG. 2. The member 10 has a force applied thereto toward the left as seen in FIG. 2 by a spring 15 and the member 10 is supported in a bearing 14a and by a universal joint 14b affixed at a frame within the main body part 2a.

The transmission member 10 and the transmission member 11 which includes a flange 11b fixed thereto are in transmitting relationship by means of a key (not shown) of a flange 10b and a keyway (not shown) of a gear 11a fixedly provided on the transmission member 11 which engage with each other with the engaged relationship being retained by the spring force provided by the spring 15.

The gear 11a is associated with a winding coupler 17 through a gear 16 within the main body part 2a.

A tightening screw 12 is arranged to affix the main body part 2a of the motor drive unit with the grip member 2b and one end of the screw 12 is formed into a tightening screw thread 12a with the tightening screw 12 comprising a knob 12b operating to tighten the screw thread 12a from outside of the grip and with a pressing part 12c, with the transmission member 11 being positioned in a hollow part of the screw thread part 12a in such a manner that it is placed to extend along the center line thereof.

A guide groove 18 is formed at the outer wall of the main body part 2a, with the groove 18 being larger than the screw thread part 12a, and further formed with a plurality of female screw threads 18a provided therein along guide holes 22, which will be described more fully hereinafter, which are arranged in pairs. The grip member 2b is affixed to the main body part 2a by screwing the tightening screw 12 into the female screw 18a.

Also provided on the grip member 2b are positioning pins 19 which are pressed under the spring force of springs 20, with one end of the pins 19 being positioned at the right hand side of the knob 12b, as shown in FIGS. 2 and 4, and being connected to a power source terminal of the motor 4. A terminal 21 connected to a power source is located in the main body part 2a and a control circuit (not shown) is also provided with the terminal 21 being provided along the guide holes 22 perforated in parallel with the guide groove 18, as shown in the drawing. A pin 21a is fixed at a position of the guide hole 22 and a contact between the pin 21a and the positioning pin 19 constitutes a switch to provide control of the supply of power to the motor 4.

Figure 5:
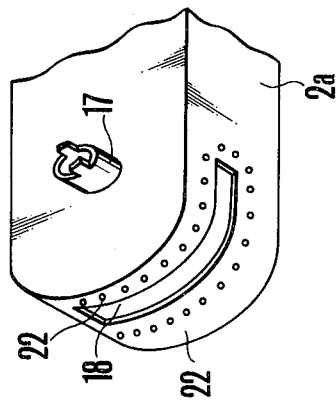
FIG. 5 is a perspective view of a portion of the main body part of the motor drive unit of the invention illustrating in greater detail a guide groove and guide holes formed therein.

FIG. 5 shows, in greater detail, the positional relationship between the guide groove 18 formed at a side of the main body part 2a of the motor drive unit of the invention and the guide holes 22.

Figure 6:
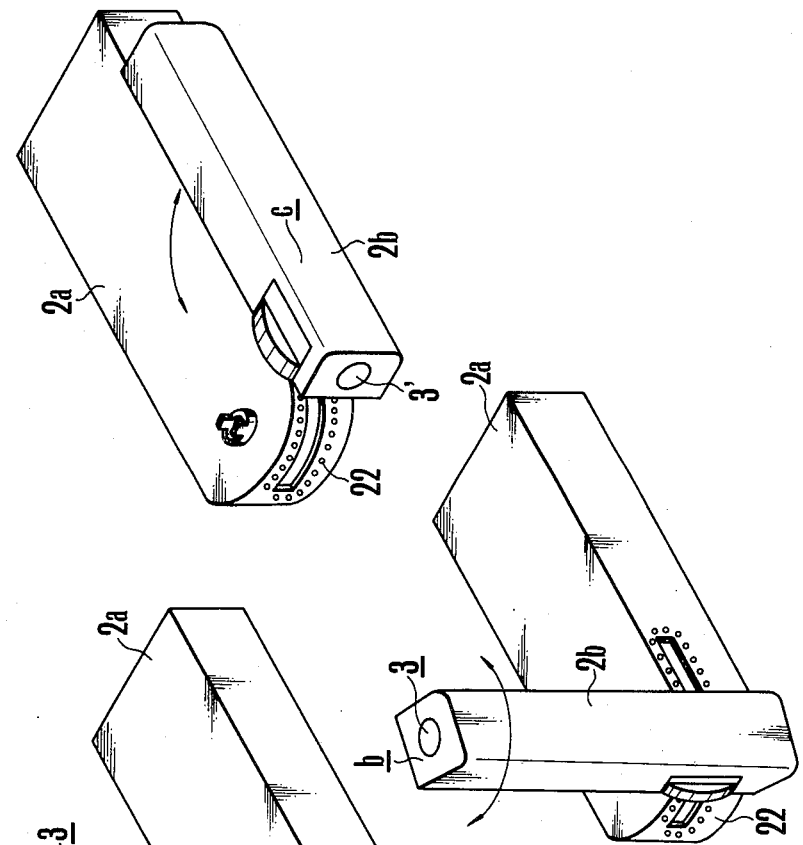
FIG. 6 is a schematic illustration showing the motor drive unit of the invention with the grip member thereof depicted in three different positions.

The knob 12b is formed with a diameter which is large enough to enable the knob to extend with its operating part outwardly of the casing of the grip member 2b but as shown in FIG. 1 and FIG. 6, it has a diameter which is somewhat smaller in size than that shown in FIGS. 2 and 4 for the sake of clarity. Also, the positioning pins 19 are provided at both upper and lower positions being symmetrical to each other and sandwiching the axle 10. At a position where the grip member 2b is set in an upward location, the pin 19 at the upper position is inserted and fitted into the guide hole 22 so that the grip member 2b is fixed with the casing of the main body portion 2a.

When the position of the grip member 2b is to be changed, the knob 12b is rotated in order to disengage the screws 18a and 12a. The knob 12b is then shifted laterally so that a member carrying the pins 19 at both sides of the knob 12b is moved against the spring force of the spring 20 thereby removing the pin 19 from guide hole 22 (see FIG. 4) in order to set the grip member 2b in a state where it is revolvable so that thereafter the grip member 2b may be shifted to a desired angle or to a desired position.

One terminal of the motor 4 is grounded while the other terminal thereof is connected to a member carrying the pin 19 so that the motor may obtain power supply through the pins 19 and 21 wherein the power supply connection is provided through the upper pin 19 or through the lower pin 19 depending upon the angle of the grip member 2b. Meanwhile, the member carrying the pin 19 and the guide hole 22 are naturally insulated against grounding, for example, to a casing, by means known in the art, details of which are here omitted.

The guide holes 22 are provided along the casing of the main body part 2a at an upper row having different phases from those of the holes provided at a lower row so that they are unsymmetrically arranged in their positional relationship whereby the pin 19 will be inserted only into the hole 22 at the upper row when the grip member 2b is held at an upward position but the pin will be inserted into the holes 22 only of a lower row when the grip 2b is held at a downward position. However, the grip 2b is shifted alongside the casing of the main body 2a and as this occurs, the positional relationship will be reversed depending upon the position, and in any event, one of the pins 19 will be inserted into the guide hole 22 depending upon the position of the grip 2b thus fixing the grip 2b and the casing of the main body member 2a.

During utilization of the assembly of the invention described above, when the motor drive unit 2 is set against the camera body 1 at the position shown in solid line form in FIG. 1, its main cross sectional view will be depicted in FIG. 2, which has previously been described in detail. Under these conditions, the pin 21a and the positioning pin 19 will be in contact with each other thus energizing the assembly and permitting electrical control. If now a release button 3 is depressed with the assembly in this condition, a release mechanism provided at the camera body 1, for example a magnetic release mechanism, will be actuated through wiring (not shown) in a manner known to those skilled in the art. This will cause the shutter of the camera to be released in order to commence an exposure. Thereafter, as the shutter is closed, a switch (not shown) provided at the camera body will be closed and power will be supplied to the motor 4 through the pins 21a, 19. Thus, the motor 4 will be driven into actuation and the flange part 10b will be driven through the gear train 5-9 and the gear 13b of the transmission member 10. The bevel gear 11a of the transmission member 11—which is engaged with the flange part 10b by means of a key and a keyway (not shown)—will be subjected to the spring force of the spring 15 and will be driven thereby driving the gear 16 and the winding coupler 17. The winding coupler 17 being operatively coupled with the windup mechanism in the camera, will operate to effect winding of the film contained in the camera.

After the winding operation is completed, a switch will automatically be opened by the aforementioned means in order to discontinue the supply of power thereby stopping the motor. Thus, a series of operative steps from a release to the winding operation will automatically occur by actuation of the release button.

When a photographing operation has been completed, the position of the grip member 2b may be changed by first rotating the tightening knob 12b to disengage the screw thread 12a from the female screw thread 18a of the guide groove 18. The knob 12b may then be moved toward the right, as viewed in FIG. 2, and the pressing part 12c will push the flange 11b of the transmission member 11 thereby releasing the engagement between the gear 11a and the gear 16. At the same time, the knob 12b will push one end of the positioning pin 19 so that the pin 19 will no longer be in contact with the pin 21a of the terminal 21. Furthermore, the pin 19 will move out of the guide hole 22 and, as a result, power will no longer be supplied to the motor.

The grip member 2b while in the position depicted in FIG. 4 may then be revolved along the guide groove 18 and around the universal joint 14b with the grip 2b also being rotatable around the axle 10 which serves as the axis of rotation.

FIG. 6 depicts the directions of movement of the grip member 2b discussed above wherein shifting from a grip position a to a position b may represent a first movement as discussed above while a shifting of the grip member between the position a and the position c represents a second movement in accordance with the mode of operation previously described.

As has been previously stated, the grip member 2b may effect movement in two different directions thereby allowing a photographer to freely and easily alter the position thereof.

As the grip member 2b is shifted to a desired position and moved relative to the guide holes 22, and the knob 12b is released, the positioning pin 19 will be pressed by the spring 20 to be again inserted into a guide hole 22. Thus, the position of the grip will again be fixed at a desired location and the positioning pin 19 will also come into contact with the pin 21a allowing electrical actuation of the motor. At the same time, the transition member 11 will be pressed by the spring 15 thereby causing the gear 11a to engage with the gear 16, thus allowing transmission of the motor drive by the unit.

Finally, the knob 12b may be rotated so that the screw thread 12a will engage with the screw thread 18a of the guide groove 18. The grip member 2b will then be firmly affixed on the main body portion 2a and, thus, the motor drive unit of the invention will then be placed in operative condition.

It should be noted that during a shifting of the grip member 2b, the motor and the power source of the device, as well as the control circuitry thereof, will be in a disconnected state. Thus, even if the release button 3 of the grip member 2b is pressed inadvertently, the motor drive mechanism will not function. Furthermore, in the movement of the grip member 2b to the position shown in FIG. 4, frictional resistance will be minimized since the movement is accomplished with a bearing and since, during rotational movement of the grip, there will not occur a dislocation in the positional relationship between the gear 11a and the gear 16 and there will also not be applied on the motor 4 a load resulting from the gears 5–10b. Even if the gear 11a and the gear 16 become displaced by some reason, there will occur no obstacle whereby the setting of the grip member may be achieved, since the spring 15 will intervene and the gears will immediately resume engagement after the motor is actuated whereby operation of the motor drive device may be normally provided.

Additionally, even if an unexpected load is applied on the device during movement of the grip member 2b, since there will occur a gap between the threaded part 12 and the transmission member 11, the load will be received by the threaded part 12 but the windup mechanism including the transmission members 10 and 11 will not be affected.

Furthermore, a release button 3' is provided at the lower end of the grip member 2b and when the grip member is in its position identified by the chain-dot line form in FIG. 1 or the grip position c shown in FIG. 6, the device may be conveniently actuated when the photography operation is to occur with the camera in a vertical position.

Since important components for the electrical winding mechanism are mostly housed within the grip 2b, fewer of the components need be housed in the main body portion 2a. Furthermore, the winding unit will be independent from a power source or a control circuit and the mechanism can be separated as a compact unit.

Figure 7:
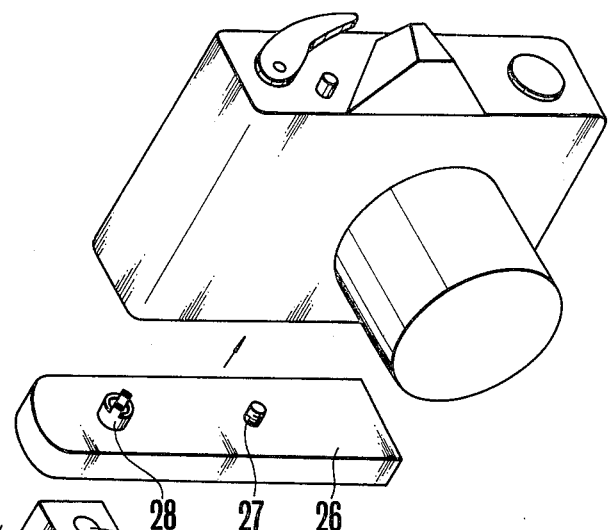
FIG. 7 is an exploded view illustrating a modified embodiment of the invention.

A further example of the invention is shown in FIG. 7 wherein there is illustrated an arrangement having the winding mechanism separated as a compact unit. Furthermore, a control circuit and a power source which are important components for the drive motor system are made respectively into separate units.

Figure 8:
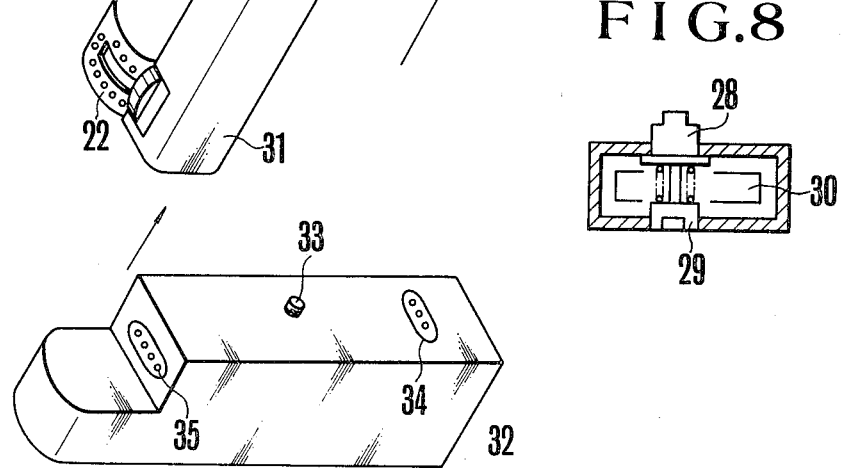
FIG. 8 is a cross sectional view of a part of the assembly depicted in FIG. 7.

As indicated in FIG. 7, a control circuit unit 26 is shown which contains, as depicted in FIG. 8, an electronics circuit 30, a coupler 29 which is adapted to be connected with the winding coupler of a windup unit 31, to be described hereinafter, and a winding coupler 28 which transmits rotation of the coupler 29 to a camera body. A mounting screw 27 as well as electrical terminals (not shown) are also provided. The winding unit 31 contains the aforementioned important components relative to the electrical winding of the motor drive device and the electrical terminal mounting screws (not shown). Also, a power source unit 32 contains a mounting screw 33, electrical terminals 34, 35 for the respective unit, and a battery (not shown). An arrangement as shown in the embodiment of FIGS. 7 and 8 will have advantages in that an ordinary motor drive device will usually have its performance significantly reduced during low temperatures because of low battery performance. However, if a combination of units can be selected such that a power source and a gear ratio are fitted for low temperature operation, normal photography may occur as would otherwise be achieved under normal temperatures. Furthermore, motor drive devices with different types of performances may be constructed of different combinations of units, such as one for high speed driving or one for low speed driving, etc., and a wide variety in the operative scope and versatility of an assembly can be achieved.

As has been explained in detail, a motor drive device according to the present invention may enable the position of the grip member to be altered by a simple procedure so that photography can be performed with optimum grip positioning depending upon the size of the photographic lens assembly utilized, and also depending upon the size of the photographer's hand and the position during which photography is to be achieved. Furthermore, the scope of the photographic process can be widened by making important components of the motor drive device into separate units. Thus, the invention provides a device for a camera which may be very conveniently set up and which may be used quite simply with versatility and with significant convenience.

While specific embodiments of the invention have been shown and described in detail to illustrate the application of the inventive principles, it will be understood that the invention may be embodied otherwise without departing from such principles.

What is claimed is:

1. An automatic device for a camera adapted to be operatively mounted on a camera body to perform winding action comprising: a main body part adapted to be connected to said camera body; a grip member including release means operably connected with said main body part and mounted to be movable relative thereto to a plurality of desired positions; driving motor means housed within said grip member; winding coupler means arranged in said main body part and adapted to engage complementary components in said camera body to transmit winding action thereto; transmission means extending between said main body part and said grip member for enabling said winding coupler means to be driven by said driving motor means; electrical contact means extending between said main body part and said grip member to enable said driving motor means to be energized therethrough from an electrical source; and releasable attachment means for enabling said grip member to be affixed relative to said main body part at any one of said plurality of desired positions; said transmission means and said electrical contact means being adapted to be operatively disengaged and re-engaged when said grip member is moved from one position to another relative to said main body part.

2. An automatic winding device according to claim 1 wherein said releasable attachment means operate to effect disengagement of said transmission means and of said electrical contact means when the fixed connection between said grip member and said main body part is released.

3. An automatic winding device according to claim 1 wherein said transmission means include axle means extending between said grip member and said main body part through which a driving force is transmitted from said driving motor means to said winding coupler means, said grip member being pivotable relative to said main body part about an axis extending perpendicularly to said axle means and also being rotatable relative to said main body part about said axle means.

4. An automatic winding device according to claim 3 wherein said transmission means include bevel gear means interposed between said axle means and said winding coupler means.

5. An automatic winding device according to claim 4 further including universal joint means having said axle means attached thereto.

6. An automatic winding device according to claim 1 wherein said main body part is formed with an arcuate elongated slot through which said transmission means extend and with a plurality of guide holes arranged adjacent said slot through which said electrical contact means extend.

7. An automatic winding device for a camera adapted to be operatively mounted on a camera body to perform a winding operation comprising a main body part adapted to be connected to said camera body and a grip member including release means operably connected with said main body part and mounted to be movable relative thereto to a plurality of different positions wherein a driving source for said winding device is housed within said grip member and wherein a transmission system to transmit a driving force through a contacting plane of said grip member and said main part of the winding device is provided, with a movable center of the grip member also being provided which generally coincides with an axis of an axle of said transmission system.

8. An automatic winding device according to claim 7 wherein said transmission system includes at least a portion thereof which may be freely extended or shortened.

9. An automatic winding device according to claim 7 wherein a winding coupler for engagement with a winding mechanism in said camera body is provided in said main body part and wherein driving source means and a transmission mechanism operatively interconnecting said driving source means with said winding coupler are housed within said grip member.

10. An automatic winding device for a camera adapted to be operatively mounted on a camera body to perform a winding operation comprising a main body part adapted to be connected to said camera body and a grip member including release means operably connected with said main body part and mounted to be movable relative thereto to a plurality of different positions, said automatic winding device further comprising fixing means provided between said main body part and said grip member for fixing said grip member at a desired angle relative to said camera.

* * * * *